(12) United States Patent
Perrin

(10) Patent No.: US 9,789,852 B2
(45) Date of Patent: Oct. 17, 2017

(54) ANTI-THEFT DEVICE FOR A STEERING COLUMN AND ASSOCIATED STEERING COLUMN

(75) Inventor: Christophe Perrin, Imphy (FR)

(73) Assignee: VALEO SECURITE HABITACLE, Créteil (FR)

(*) Notice: Subject to any disclaimer, the term of this patent is extended or adjusted under 35 U.S.C. 154(b) by 410 days.

(21) Appl. No.: 14/234,423

(22) PCT Filed: Jul. 24, 2012

(86) PCT No.: PCT/EP2012/064549
§ 371 (c)(1),
(2), (4) Date: Jul. 15, 2015

(87) PCT Pub. No.: WO2013/014173
PCT Pub. Date: Jan. 31, 2013

(65) Prior Publication Data
US 2016/0144825 A1     May 26, 2016

(30) Foreign Application Priority Data

Jul. 25, 2011 (FR) ..................... 11 02312

(51) Int. Cl.
   *B60R 25/20*     (2013.01)
   *B60R 25/021*     (2013.01)
   *B60R 25/22*     (2013.01)

(52) U.S. Cl.
CPC ............ *B60R 25/20* (2013.01); *B60R 25/021* (2013.01); *B60R 25/225* (2013.01)

(58) Field of Classification Search
CPC ........... B60R 25/02134; B60R 25/0211; B60R 25/021; B60R 25/02126; B60R 25/225;
(Continued)

(56) References Cited

U.S. PATENT DOCUMENTS 3,650,131 A * 3/1972 Eichenauer ....... B60R 25/02121
                                               70/252
3,680,335 A * 8/1972 Onishi ............. B60R 25/02128
                                              180/286
(Continued)

FOREIGN PATENT DOCUMENTS

EP     0 590 330 A1    4/1994
EP     0 705 744 A2    4/1996
(Continued)

OTHER PUBLICATIONS

International Search Report for corresponding International Application No. PCT/EP2012/064549, dated Sep. 20, 2012 (6 pages).

*Primary Examiner* — Suzanne Barrett
(74) *Attorney, Agent, or Firm* — Osha Liang LLP

(57) ABSTRACT

The invention relates to an anti-theft device (1) for a steering column of a motor vehicle, said device (1) comprising: a bolt (7) mounted such that it can move in translation in the device (1) between a position in which the steering column is locked and a position in which the column is released, and a means (15) for controlling the movement of the bolt (7). The device also comprises a drive means (9) connecting the control means (15) and the bolt (7), said drive means (9) including a housing (20) that receives at least part of a locking element (19) when the locking element (19) is in the rest and active positions. The aforementioned locking element (19) is configured to co-operate with the control means such as, in the active position, to lock the drive means (9) when the bolt (7) is in the locked position.

8 Claims, 3 Drawing Sheets

(58) Field of Classification Search
CPC ... B60R 25/20; B60R 25/02; Y10T 29/49826; Y10T 70/5611; Y10T 70/5664; Y10T 70/5956; Y10T 70/5659; Y10T 70/56125
USPC .......................................... 70/182–186, 252
See application file for complete search history.

(56) References Cited

U.S. PATENT DOCUMENTS

| | | | | |
|---|---|---|---|---|
| 3,686,906 | A * | 8/1972 | Watkins | B60R 25/02126 70/252 |
| 4,031,728 | A * | 6/1977 | Eichenauer | B60R 25/02131 70/180 |
| 4,143,528 | A * | 3/1979 | Weber | B60R 25/02126 70/1.5 |
| 4,759,203 | A * | 7/1988 | Lieb | B60R 25/02142 70/185 |
| 4,776,189 | A * | 10/1988 | Weber | B60R 25/02147 70/182 |
| 6,354,117 | B1 * | 3/2002 | Canard | B60R 25/02121 70/186 |
| 6,516,640 | B2 * | 2/2003 | Jacobs | B60R 25/02128 70/186 |
| 6,880,374 | B2 * | 4/2005 | Yukihara | B60R 25/02115 70/1.5 |
| 8,001,814 | B2 * | 8/2011 | Okada | B60R 21/05 70/186 |
| 8,240,176 | B2 * | 8/2012 | Okada | B60R 25/02153 292/170 |
| 8,756,962 | B2 * | 6/2014 | Tamezane | B60R 25/02153 70/186 |
| 8,857,231 | B2 * | 10/2014 | Perrin | B60R 25/02 70/183 |
| 9,315,170 | B2 * | 4/2016 | Poggi | B60R 25/02134 |
| 2002/0066295 | A1 * | 6/2002 | Jacobs | B60R 25/02128 70/186 |
| 2004/0075232 | A1 * | 4/2004 | Zillmann | B60R 25/02153 280/89 |
| 2004/0099024 | A1 | 5/2004 | Ochi | |
| 2004/0107749 | A1 * | 6/2004 | Yukihara | B60R 25/02115 70/186 |
| 2004/0148983 | A1 * | 8/2004 | Suzuki | B60R 25/02153 70/186 |
| 2008/0110219 | A1 * | 5/2008 | Maltaverne | B60R 25/0211 70/210 |
| 2009/0064739 | A1 * | 3/2009 | Trischberger | B60R 25/02153 70/237 |
| 2009/0266122 | A1 * | 10/2009 | Okada | B60R 25/02 70/252 |
| 2010/0011819 | A1 * | 1/2010 | Giacomin | B60R 25/02121 70/187 |
| 2011/0167885 | A1 * | 7/2011 | Sugimoto | B60R 25/02 70/186 |
| 2014/0047876 | A1 * | 2/2014 | Perrin | B60R 25/02 70/183 |

FOREIGN PATENT DOCUMENTS

| | | |
|---|---|---|
| FR | 2 937 602 A1 | 4/2010 |
| WO | 02/085678 A1 | 10/2002 |

* cited by examiner

ANTI-THEFT DEVICE FOR A STEERING COLUMN AND ASSOCIATED STEERING COLUMN

The present invention relates to an antiheft device for a steering column. The invention finds a particularly advantageous application in the automotive field.

It relates more particularly to a vehicle antitheft device involving a locking member or locking bolt that locks the steering column of a motor vehicle when the ignition key is removed. To this end, the bolt is mounted with the ability to move in the antitheft device between a position in which the column is locked and a position in which the column is free.

Such antitheft devices generally comprise a lock with a stator and a rotor operated by a coded key and controlling, notably as it turns, the movement of the bolt.

More specifically, the bolt can be controlled by a pullrod connected to a cam, itself secured to the lock rotor, said cam having the function of converting the rotational movement of the rotor into a translational movement of the associated pullrod and associated bolt.

The lock therefore, via the pullrod, allows the bolt to be unlocked from the position in which it locks the rotation of the steering column.

There are such things as what are referred to as "soft" break-in attempts in which an individual with malevolent intent attempts to gain access to the pullrod without pulling out the lock, for example by drilling a hole.

It is known practice to propose a locking device that has an element that blocks the translational movement of the bolt between a locking position when the lock is in the locking position, and a rest position in which the blocking element frees the bolt when the lock is in the operating position. The blocking element is in the form of a lever mounted such that it can pivot and having a first end able to nestle in an indentation in the cam and a second, opposite, end configured to oppose the movement of the bolt.

Despite the advantages afforded by this locking device, there is a need to provide a locking device that is simple, effective, less bulky and difficult to access from the outside.

To this end, a first aspect of the invention relates to a locking device for a motor vehicle steering column, said device comprising:

a bolt mounted with the ability to effect translational movement in said device between a position in which the steering column is locked and a position in which said column is free, and
  a means controlling the movement of said bolt, said device further comprising a drive means connecting the control means and the bolt, said drive means comprising a housing accommodating at least part of a blocking element when the blocking element is in the rest position and in the active position, said blocking element being configured to collaborate with the control means in such a way as to come into the active position to block the drive means when the bolt is in the locking position.

By virtue of the invention, when the motor vehicle is at rest, the drive means is blocked by the blocking element. As a result, the drive means can no longer be moved in order to disengage the bolt from its locking position.

The blocking element thus makes it possible to detect whether the control means is in the rest or locking position.

If an individual of malevolent intent attempts a soft break-in, for example by drilling a hole near the drive means in order to move said drive means, the latter cannot be moved and the bolt remains blocked.

Furthermore, the configuration where the blocking element is positioned at least partially in a housing provided in the drive means makes it very difficult to access from the outside. Indeed, the housing in the drive means forms a protection around the blocking element.

In addition, the device of the invention is compact. Specifically, the drive means of the bolt controlled by the control means houses the blocking element.

The device of the invention is furthermore simple to use and to manufacture.

Said device may furthermore have one or more of the following features, considered separately or in combination:

said drive means comprises a first part intended to collaborate with the blocking element and a second part configured to drive the movement of the bolt;
  the second part comprises a projecting element able to become lodged in a complementary slot belonging to the bolt, allowing effective drive of the bolt;
  the blocking element is associated with an elastic return means, at least a part of said blocking element and the elastic return means being able to be housed in the housing of the drive means, allowing the drive means to be blocked in a simple, effective and robust way;
  the elastic return means is a compression spring, allowing the pin to be kept constantly under tension;
  the control means comprises an orifice able to accept the free end of the blocking element, allowing the control means to be blocked in a simple and effective way;
  the drive means and the control means are configured in such a way as to have a dead travel relative to one another;
  the control means comprises a cam configured to be secured to a rotor of a lock and to control the movement of said bolt and the movement of said drive means, allowing the rotational movement of the cam to be transmitted to the drive means;
  the orifice is delimited by a fairly sloping wall that forms a ramp for guiding the end, allowing easy unblocking of the blocking element.

The invention also covers a motor vehicle steering column comprising an antitheft device as defined hereinabove.

Further features and advantages of the invention will become more clearly apparent from reading the following description, given by way of illustrative and nonlimiting example, and from studying the attached drawings in which:

FIG. 1 schematically depicts a perspective side view of one embodiment of an antitheft device according to the invention;

In these figures, elements that are substantially identical bear the same references.

Figure 1:
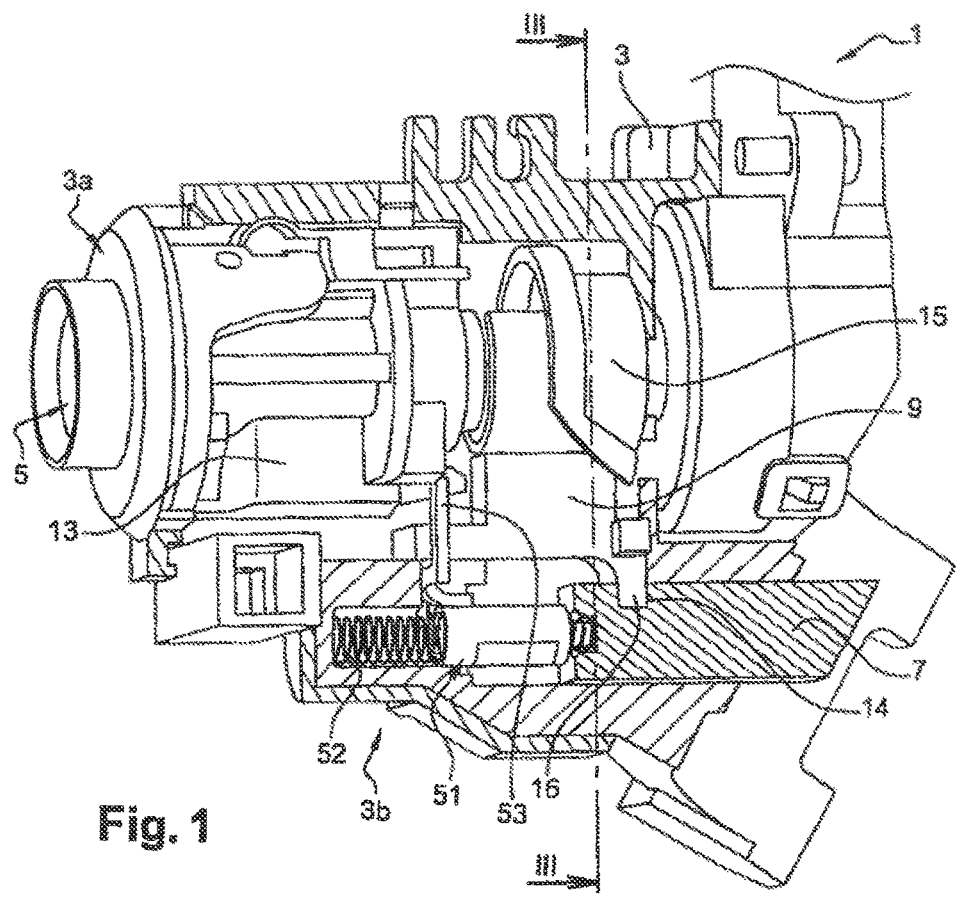

FIG. 1 depicts a motor vehicle antitheft device according to the invention, denoted by the overall reference 1. This antitheft device 1 is intended to control the starting of an engine of the vehicle and the locking of the steering column (not depicted) of the vehicle.

The antitheft device 1 has an antitheft body 3 in the form of a protective shell.

Figure 2:
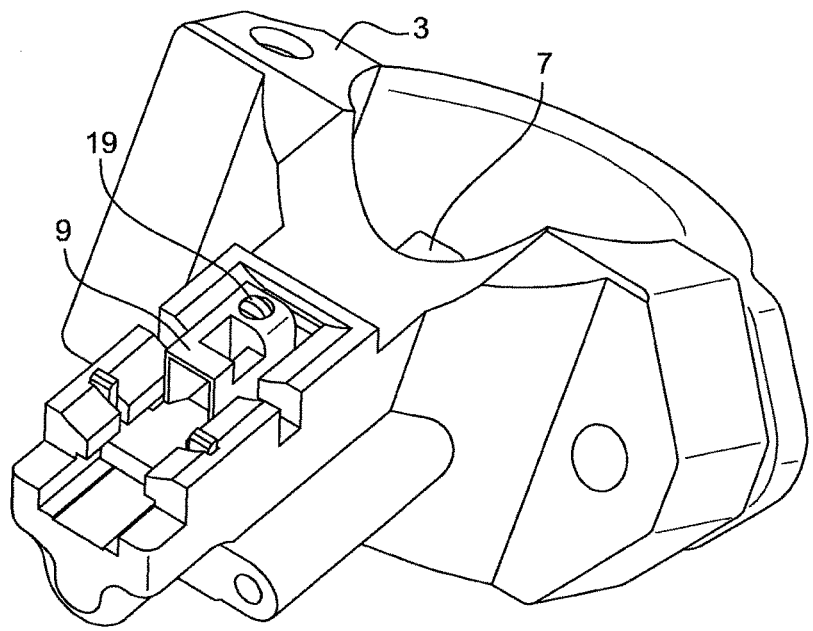
FIG. 2 is a perspective view from above of the drive means and of the blocking element of FIG. 1, arranged inside a protective shell.

This antitheft body 3 comprises a lock 5, a locking bolt 7 that locks the steering column (not depicted), and a drive means 9 associated with a blocking element (best visible in FIG. 2) that blocks the locking bolt 7.

In the example illustrated in FIG. 1, the antitheft body 3 has a front first part 3*a* housing the lock 5 and a rear second part 3*b* housing the bolt 7.

The terms "front" and "rear" are used here in relation to accessibility by a user. The user has access to the front part 3*a* of the antitheft body 3 in order to insert his ignition key. The rear part 3*b* of the antitheft body 3 is itself in close proximity to the steering column.

The lock 5 comprises a rotor (not visible) mounted so that it can rotate in a stator 13.

According to the embodiment illustrated, the lock 5 also has a cam 15 secured to the rotor, for example arranged at the rear end of the rotor.

The cam 15 has a body of cylindrical overall shape coaxial with the rotor.

The rotor therefore drives the rotation of this cam 15.

The lock 5 is able to move between a locking position and at least one operating position.

When the user turns the ignition key in the rotor 11, the lock is in the operating position so that it, for example, controls the accessories of the vehicle or controls starting. Different angular positions of the rotor may be provided for controlling the accessories and the starting.

In the locking position, the key is not inserted into the rotor or the key is inserted but has not been turned to one of the operating angular positions.

The bolt 7 is mounted such that it can slide in the antitheft body 3. To that end the antitheft body 3 may in its rear part 3*b* have a bolt guide (not depicted) for the sliding of the bolt 7.

The bolt 7 is able to move between a position in which the steering column (not depicted) is locked and a position in which this column is free.

In the locking position, the bolt 7 engages in the conventional way with part of the steering column (not depicted) in order to block the rotation thereof. In this locking position, the bolt 7 generally projects relative to the antitheft body 3.

By contrast, in the free position, the bolt 7 is retracted into the antitheft body 3 to free the column.

The device of the invention comprises a control means, here in the form of the cam 15, for controlling in the movement of the locking bolt 7 between the positions in which the steering column (not depicted) is locked and free. The control means 15 controls the movement of the bolt 7 into the locking position when the lock 5 is in the locking position. When the lock 5 is in the operating position, the bolt 7 remains in the position in which the column is free.

Said device of the invention further comprises a drive means 9 connecting the control means 15 and the bolt 7.

The drive means 9 is configured to drive the translational movement of the bolt 7 when the control means, in this instance the cam 15 is turned.

To do this, said drive means 9 may comprise a first part (not visible) intended to collaborate with the control means, in this instance the cam 15, and a second part 14 configured to drive the movement of the bolt 7.

For this, the first part may be a fairly rounded part of the drive means which part is intended to collaborate with the cam 15 via a slope-forming component 17. The drive means 9 and the control means, in this instance in the form of the cam 15, may be configured so that they have a dead travel relative to one another, particularly at the connection between the fairly rounded part of the drive means 9 and the slope 17 of the cam. Thus, advantageously, when the blocking means disengages from the control means, the drive means is set in motion in a second step by the control means, in this instance the cam.

The second part 14 may comprise a projecting element 16 able to nestle in a complementary slot (not visible in the figures) belonging to the bolt 7, thus allowing effective and durable driving of the bolt 7.

The drive means 9 further comprises a housing 20 accommodating at least part of a blocking element 19, when the blocking element 19 is in the rest position and in the active position, said blocking element 19 being configured to collaborate with the control means in such a way as to come into the active position to block the drive means 9 when the bolt 7 is in the locking position.

Figure 3:
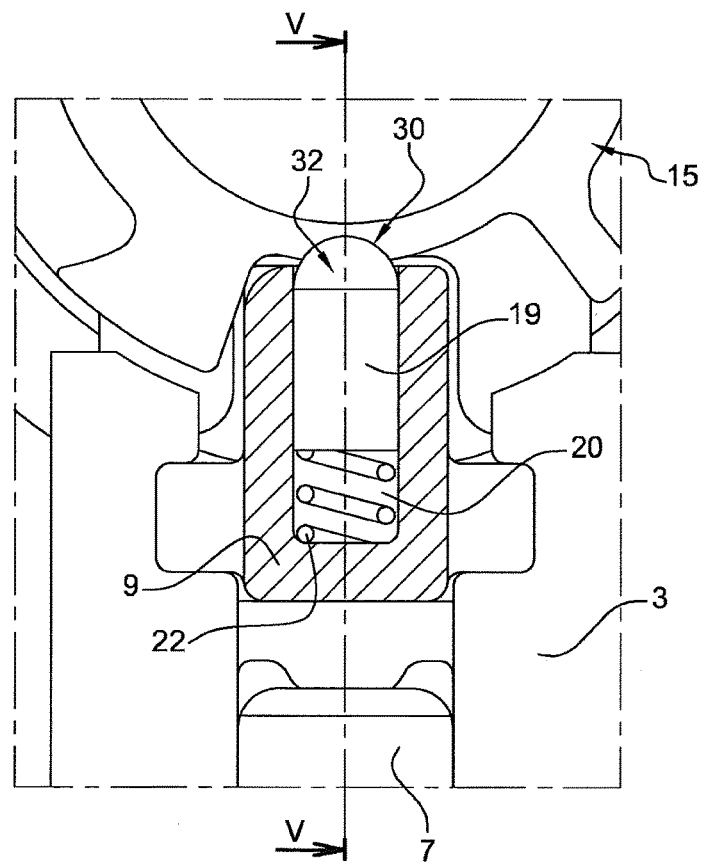
FIG. 3 is a cross section on of FIG. 1 showing the drive means and the blocking element.
Figure 4:
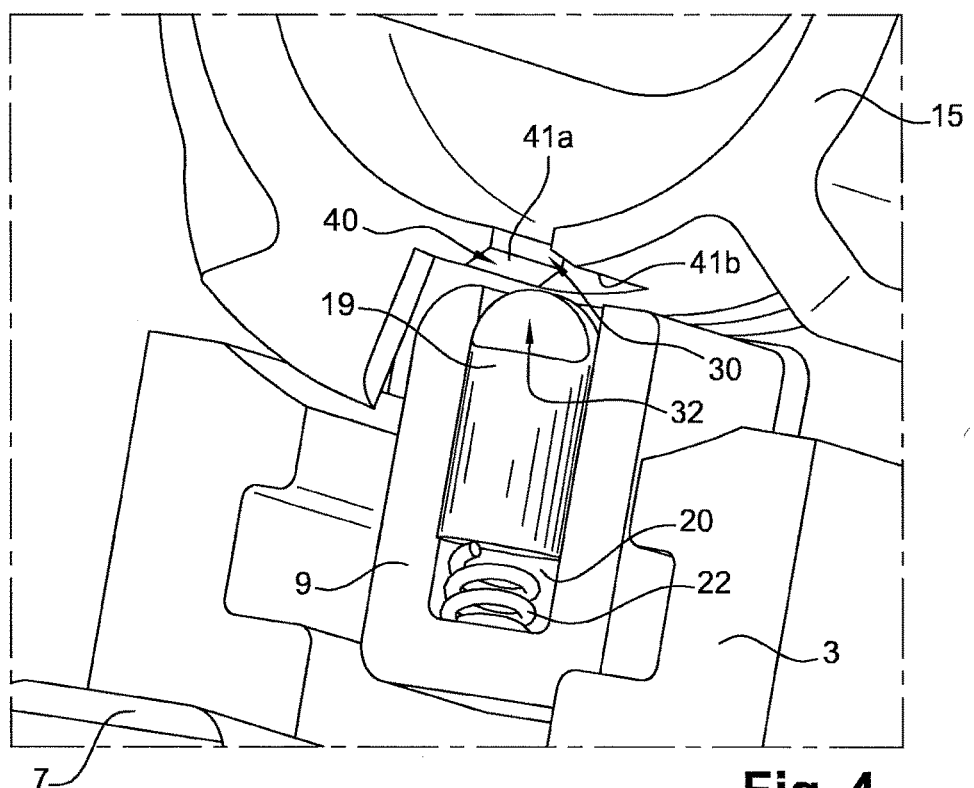
FIG. 4 is a side view of the cross section of FIG. 3.
Figure 5:
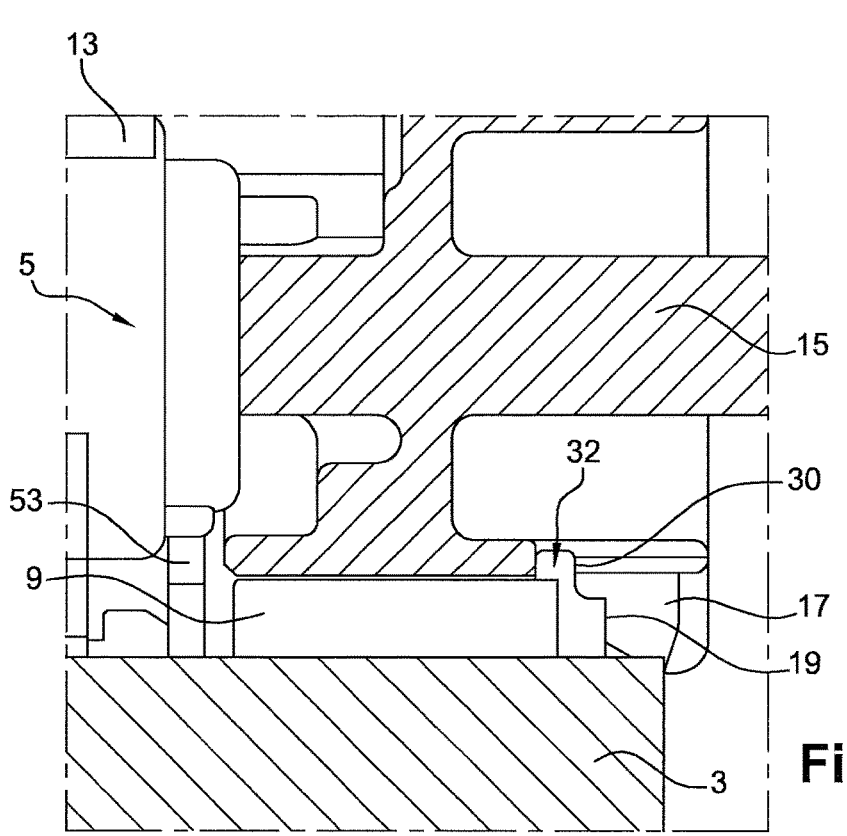
FIG. 5 is a longitudinal section on V-V of FIG. 3, showing the drive means and the blocking element.

This blocking element 19 is able to move between an active position visible in FIGS. 3 and 5, and a rest position visible in FIG. 4.

The blocking element 19 thus makes it possible to detect that the rotor is in the locking position and block the bolt 7 in this position.

By virtue of the invention, when the motor vehicle is at rest, the control means is blocked by the blocking element 19. As a result, the drive means 9 can no longer be moved to disengage the bolt 7 from its locking position.

If an individual with malevolent intent attempts a soft break-in, for example by drilling a hole near the drive means 9, in order to move said drive means 9, the latter cannot be moved and the bolt 7 remains blocked.

In addition, the device of the invention 1 is compact. Specifically, the drive means 9 that drives the bolt controlled by the control means, houses the blocking element 19.

The configuration whereby the blocking element 19 is arranged at least partially inside a housing 20 provided in the drive means 9 makes access from the outside very difficult. Specifically, the housing 20 of the drive means forms a protection around the blocking element 9.

The housing 20 thus forms a protective shell for the blocking element 19.

The housing 20 is adequately dimensioned to allow it to house the blocking element 19 and possibly the means for setting said element 19 in motion.

Thus, the blocking element 19 may be partially contained inside the housing, or even fully contained therein with the exception of the part that collaborates with the blocking means.

According to the embodiment depicted in the figures, the blocking element 19 is associated with an elastic return means 22 as depicted in the figures. At least part of said blocking element 19 and the elastic return means 22 are able to be housed in the housing of the drive means. This allows the drive means to be blocked in its movement, in this instance in terms of translational movement, in a simple, effective and robust way.

The blocking element may take any other form, notably that of a pin. Thus, the blocking element may be in the form of a metal or plastic plate, or even in the form of a lever.

The blocking element has a free end 32 intended to block the drive means and an end intended to collaborate with the elastic return means 22.

The elastic return means 22 may be a compression spring, allowing the pin to be kept constantly under tension. The elastic return means 22 thus advantageously allows the pin to pass from the active position into the rest position.

The control means may comprise an orifice 30 able to accommodate the free end 32 of the blocking element, allowing the drive means to be blocked in a simple and effective way.

The orifice 30 may be closed or alternatively open, as depicted in FIG. 4.

The orifice 30 has a dimension and shape suited to the size of the free end 32 intended to collaborate therewith. The orifice 30 may be circular or even substantially oval.

The free end 32 may, for example, be substantially ogee shaped or have any other projecting shape able to nestle in an opening 30 made in the wall of the cam 15. The free end 32 may, as is the case here, have one or more truncated portions.

As depicted in FIGS. 3 and 5, the active position of the blocking element here corresponds to the position in which the pin is in the orifice 30.

As depicted in FIG. 4, the rest position corresponds to the position in which the pin is distant from the orifice.

The orifice 30 may further be delimited by a fairly sloping wall 40 forming a guide ramp for the free end 32 thus allowing the pin 20 to disengage from the cam 15 and unblock the drive means 9 when the cam 15 is turned by the rotor (see FIG. 4). Thus, in the active position, only the end 32 is disengaged from the housing 20 to become blocked in the cam 15.

According to an alternative form that has not been depicted, the device of the invention 1 may further comprise reinforcing means arranged substantially along the drive means 9 near the blocking element 19 making access to the blocking element 19 even more difficult.

Thus, when the lock 5 is in the locking position, the blocking element 19 positions itself in the active position in which the end 32 of the pin enters the orifice 30. That has the effect of blocking the translational movement of the drive means 9. The rest of the body of the pin 32 is inserted inside the housing 20 and protected thereby. In this configuration, the drive means 9 can no longer drive a translational movement of the bolt 7 which remains blocked.

When the lock 5 is in the operating position and has therefore been turned, said lock 5 turns the cam 15. The end 32 of the pin is driven by the ramp 41a or 41b formed by the wall 40 which forces it to disengage from the cam 15. The drive means 9 becomes capable of moving and may drive a translational movement of the bolt 7 in order to unlock the latter.

The device may also comprise a super-deadlocking means allowing the bolt 7 to be blocked when the lock 5 is pulled out. According to the embodiment depicted in FIG. 1, the super-deadlocking means comprises a deadlocking pin 51 interposed between the bolt 7 and the compression spring 52 and that allows translational movement of the bolt 7 to be blocked when an attack is detected.

The pin 51 is associated with a plate 53 connected to the stator 13. The plate 53 is configured to keep the pin 52 blocked in a position in which it does not block the bolt 7. When the lock 5 is pulled out, the plate disengages from the pin 51 which therefore blocks, blocking the bolt 7.

The invention claimed is:

1. An antitheft device for a steering column of a motor vehicle, said antitheft device comprising:
   a bolt mounted with the ability to affect translational movement in said antitheft device between a position in which the steering column is locked and a position in which said column is free;
   a control means for controlling the movement of said bolt; and
   a drive means connecting the control means and the bolt and configured to drive the translational movement of the bolt, wherein
   said drive means comprises a housing that accommodates at least part of a blocking element if the blocking element is in a rest position and in an active position,
   said blocking element is configured to engage with the control means to come into the active position to block the drive means if the bolt is in the locking position,
   said drive means comprises a first part that is intended to engage with the blocking element and a second part configured to drive the translational movement of the bolt when the control means is turned,
   the control means comprises an orifice that accepts a free end of the blocking element, and
   wherein the orifice has circular or oval shape.

2. The antitheft device as claimed in claim 1, wherein the second part comprises a projecting element that becomes lodged in a complementary slot belonging to the bolt.

3. The antitheft device as claimed in claim 1, wherein the blocking element is connected to an elastic return means, at least a part of said blocking element and the elastic return means being housed in the housing of the drive means.

4. The antitheft device as claimed in claim 3, wherein the elastic return means is a compression spring.

5. The antitheft device as claimed in claim 1, wherein the drive means and the control means are configured to have a dead travel relative to one another.

6. The antitheft device as claimed in claim 1, wherein an orifice is delimited by a sloping wall that forms a ramp for guiding an end.

7. The antitheft device as claimed in claim 1, wherein the control means comprises a cam that is secured to a rotor of a lock and controls the movement of said bolt and the movement of said drive means.

8. An antitheft device for a steering column of a motor vehicle, said antitheft device comprising:
   a bolt mounted with the ability to affect translational movement in said antitheft device between a position in which the steering column is locked and a position in which said column is free;
   a control means for controlling the movement of said bolt; and
   a drive means connecting the control means and the bolt and configured to drive the translational movement of the bolt, wherein
   said drive means comprises a housing that accommodates at least part of a blocking element if the blocking element is in a rest position and in an active position,
   said blocking element is configured to engage with the control means to come into the active position to block the drive means if the bolt is in the locking position,
   said drive means comprises a first part that is intended to engage with the blocking element and a second part configured to drive the translational movement of the bolt when the control means is turned,
   the control means comprises an orifice that accepts a free end of the blocking element,
   the orifice is delimited by a sloping wall that forms a ramp for guiding an end, and
   wherein the orifice has circular or oval shape.

* * * * *